United States Patent [19]
van Gestel

[11] Patent Number: 5,585,857
[45] Date of Patent: Dec. 17, 1996

[54] METHOD OF TRANSMITTING TELETEXT PAGE CODES FOR HEXADECIMAL PAGES

[75] Inventor: Henricus A. W. van Gestel, Eindhoven, Netherlands

[73] Assignee: U.S. Philips Electronics Corporation, New York, N.Y.

[21] Appl. No.: 353,842

[22] Filed: Dec. 12, 1994

[30] Foreign Application Priority Data

Jun. 16, 1994 [EP] European Pat. Off. ............. 94201726

[51] Int. Cl.$^6$ .............................. H04N 7/087; H04N 7/08
[52] U.S. Cl. ............................................ 348/467; 348/468
[58] Field of Search .................................. 348/467, 468, 348/465, 463, 461, 460, 466, 478, 473; H04N 7/087, 7/08, 7/088

[56] References Cited

U.S. PATENT DOCUMENTS 5,355,170  10/1994  Eitz et al. ................................ 348/466

OTHER PUBLICATIONS

"Teletext Specification", Interim Technical Document SPB492, european broadcasting Union, Geneva, Dec. 1992, pp. 76–83.

Primary Examiner—Safet Metjahic
Attorney, Agent, or Firm—Debra K. Stephens

[57] ABSTRACT

A table contains codes for consecutive decimally numbered pages and pages whose numbers contain hexadecimal digits. Codes for all the pages having decimal units numbers are arranged in rows and columns such that a column contains codes for pages having a same units number, and codes for pages having a same tens number (whether decimal or hexadecimal) are in the same row. Codes for pages having a hexadecimal units number are arranged in a continuation of the rows and columns, hexadecimal units being arranged in the columns under the corresponding decimal units.

12 Claims, 4 Drawing Sheets

|       | c=0 |    |    |    |    | 5  |    |    |    |    | 10 |    |    |    |    | 15 |    |    |    | 19 |    |
|-------|-----|----|----|----|----|----|----|----|----|----|----|----|----|----|----|----|----|----|----|----|----|
| r=0   | 00  | 01 | 02 | 03 | 04 | 05 | 06 | 07 | 08 | 09 | 10 | 11 | 12 | 13 | 14 | 15 | 16 | 17 | 18 | 19 |    |
| 1     | 20  | 21 | 22 | 23 | 24 | 25 | 26 | 27 | 28 | 29 | 30 | 31 | 32 | 33 | 34 | 35 | 36 | 37 | 38 | 39 | 41 |
| 2     | 40  | 41 | 42 | 43 | 44 | 45 | 46 | 47 | 48 | 49 | 50 | 51 | 52 | 53 | 54 | 55 | 56 | 57 | 58 | 59 |    |
| 3     | 60  | 61 | 62 | 63 | 64 | 65 | 66 | 67 | 68 | 69 | 70 | 71 | 72 | 73 | 74 | 75 | 76 | 77 | 78 | 89 |    |
| 4     | 80  | 81 | 82 | 83 | 84 | 85 | 86 | 87 | 88 | 89 | 90 | 91 | 92 | 93 | 94 | 95 | 96 | 97 | 98 | 99 |    |
| 5     | A0  | A1 | A2 | A3 | A4 | A5 | A6 | A7 | A8 | A9 | B0 | B1 | B2 | B3 | B4 | B5 | B6 | B7 | B8 | B9 | 42 |
| 6     | C0  | C1 | C2 | C3 | C4 | C5 | C6 | C7 | C8 | C9 | D0 | D1 | D2 | D3 | D4 | D5 | D6 | D7 | D8 | D9 |    |
| 7     | E0  | E1 | E2 | E3 | E4 | E5 | E6 | E7 | E8 | E9 | F0 | F1 | F2 | F3 | F4 | F5 | F6 | F7 | F8 | F9 |    |
| 8     | 0A  | 0B | 0C | 0D | 0E | 0F | 1A | 1B | 1C | 1D | 1E | 1F | 2A | 2B | 2C | 2D | 2E | 2F | —  | —  | 43 |
| 9     | 3A  | 3B | 3C | 3D | 3E | 3F | 4A | 4B | 4C | 4D | 4E | 4F | 5A | 5B | 5C | 5D | 5E | 5F | —  | —  |    |
| 10    | 6A  | 6B | 6C | 6D | 6E | 6F | 7A | 7B | 7C | 7D | 7E | 7F | 8A | 8B | 8C | 8D | 8E | 8F | —  | —  |    |
| 11    | 9A  | 9B | 9C | 9D | 9E | 9F | AA | AB | AC | AD | AE | AF | BA | BB | BC | BD | BE | BF | —  | —  |    |
| 12    | CA  | CB | CC | CD | CE | CF | DA | DB | DC | DD | DE | DF | EA | EB | EC | ED | EE | EF | —  | —  |    |
| 13    | FA  | FB | FC | FD | FE | FF | —  | —  | —  | —  | —  | —  | —  | —  | —  | —  | —  | —  | —  | —  |    |

|   | c=0 |    |    |    |    | 5  |    |    |    |    | 10 |    |    |    |    | 15 |    |    |    | 19 |   |
|---|-----|----|----|----|----|----|----|----|----|----|----|----|----|----|----|----|----|----|----|----|---|
| r=0 | 00 | 01 | 02 | 03 | 04 | 05 | 06 | 07 | 08 | 09 | 10 | 11 | 12 | 13 | 14 | 15 | 16 | 17 | 18 | 19 | |
| 1 | 20 | 21 | 22 | 23 | 24 | 25 | 26 | 27 | 28 | 29 | 30 | 31 | 32 | 33 | 34 | 35 | 36 | 37 | 38 | 39 | 41 |
| 2 | 40 | 41 | 42 | 43 | 44 | 45 | 46 | 47 | 48 | 49 | 50 | 51 | 52 | 53 | 54 | 55 | 56 | 57 | 58 | 59 | |
| 3 | 60 | 61 | 62 | 63 | 64 | 65 | 66 | 67 | 68 | 69 | 70 | 71 | 72 | 73 | 74 | 75 | 76 | 77 | 78 | 89 | |
| 4 | 80 | 81 | 82 | 83 | 84 | 85 | 86 | 87 | 88 | 89 | 90 | 91 | 92 | 93 | 94 | 95 | 96 | 97 | 98 | 99 | |
| 5 | A0 | A1 | A2 | A3 | A4 | A5 | A6 | A7 | A8 | A9 | B0 | B1 | B2 | B3 | B4 | B5 | B6 | B7 | B8 | B9 | 42 |
| 6 | C0 | C1 | C2 | C3 | C4 | C5 | C6 | C7 | C8 | C9 | D0 | D1 | D2 | D3 | D4 | D5 | D6 | D7 | D8 | D9 | |
| 7 | E0 | E1 | E2 | E3 | E4 | E5 | E6 | E7 | E8 | E9 | F0 | F1 | F2 | F3 | F4 | F5 | F6 | F7 | F8 | F9 | |
| 8 | 0A | 0B | 0C | 0D | 0E | 0F | 1A | 1B | 1C | 1D | 1E | 1F | 2A | 2B | 2C | 2D | 2E | 2F | -- | -- | 43 |
| 9 | 3A | 3B | 3C | 3D | 3E | 3F | 4A | 4B | 4C | 4D | 4E | 4F | 5A | 5B | 5C | 5D | 5E | 5F | -- | -- | |
| 10 | 6A | 6B | 6C | 6D | 6E | 6F | 7A | 7B | 7C | 7D | 7E | 7F | 8A | 8B | 8C | 8D | 8E | 8F | -- | -- | |
| 11 | 9A | 9B | 9C | 9D | 9E | 9F | AA | AB | AC | AD | AE | AF | BA | BB | BC | BD | BE | BF | -- | -- | |
| 12 | CA | CB | CC | CD | CE | CF | DA | DB | DC | DD | DE | DF | EA | EB | EC | ED | EE | EF | -- | -- | |
| 13 | FA | FB | FC | FD | FE | FF | -- | -- | -- | -- | -- | -- | -- | -- | -- | -- | -- | -- | -- | -- | |

1

METHOD OF TRANSMITTING TELETEXT PAGE CODES FOR HEXADECIMAL PAGES

BACKGROUND OF THE INVENTION

The invention relates to a method of transmitting teletext pages, in which a table is transmitted in which a code for consecutive decimally numbered teletext pages is accommodated in successive columns of consecutive rows. The invention also relates to a teletext transmission station and a teletext receiver.

A method of the type mentioned in the opening paragraph is described on pages 76–83 of "Teletext Specification", Interim Technical Document SPB 492 published by the European Broadcasting Union in December 1992. More particularly, this document describes a TOP page (Table Of Pages) in which a code is incorporated for the decimally numbered teletext pages. This code indicates, for example for each page whether this page is actually transmitted or whether it is the first of a group of pages about a given subject, or whether it is a rotating page, and the like. There are two versions of the TOP page, a first version with codes for all 800 teletext pages and a version with codes for the 100 teletext pages of a teletext magazine. A teletext magazine is formed by the plurality of pages having the same start digit. For example, there is a TOP page for the page numbers in the range between 100 and 199, a TOP page for the page numbers in the range between 200 and 299, etc.

The codes are accommodated in rows and columns at the character positions of the TOP page. More particularly the forty character positions of the first text row of the TOP page comprise the code for the teletext pages 100–139, the forty character codes of the second text row comprise the code for the teletext pages 140–179, etc. Thus, 800 codes for the pages 100–899 are accommodated in twenty rows. In the magazine version of the TOP page, 100 codes are accommodated in 3 rows. In the known method, the position of the code for a given teletext page can be established by means of a simple computing operation.

The known TOP page comprises only the codes for the teletext pages having a decimal page number. This is understood to mean a page number which is built up of the digits 0–9 which can be selected by means of the keys on a conventional hand-held remote-control unit. As is assumed to be known, the tens and units of a teletext page number are, however, constituted by a 4-bit digit which may assume 16 values. For some applications it is conventional practice to transmit teletext pages with a page number, one or more digits of which are outside the range of 0–9. In this connection it is common practice to speak of hexadecimal page numbers. Examples are 10A–10F, 1A0–1AF, 1F0–1FF. Hexadecimal page numbers cannot be called with the conventional hand-held remote-control unit. They are used to transmit additional information such as enhancement data for upgrading a standard page to a higher display level. The term "extension page" will hereinafter be often used for hexadecimal pages and "basic page" for the decimal pages.

SUMMARY OF THE INVENTION

It is an object of the invention to provide a method of transmitting teletext pages in which it is also indicated for the hexadecimal pages whether they are transmitted, or whether it is a rotating page, and the like.

To this end the method according to the invention is characterized in that codes for hexadecimally numbered teletext pages are accommodated in further rows of the table.

2

It is thereby achieved that the existing relation between the positions of the codes already used for basic pages and the decimal page number is not modified. Moreover, it is thereby achieved that only those further rows of the table in which a code is accommodated for actually transmitted hexadecimal pages are to be transmitted.

Per teletext magazine, 156 hexadecimal pages can be transmitted. In practice, these codes will be accommodated in the afore-mentioned "magazine version" of the TOP page. In fact, this page still has enough rows available for this purpose. The codes can be accommodated in the TOP page in various ways. The table for decimally numbered teletext pages is preferably extended in a logic manner so that the already existing relation between page number and table position is maintained as much as possible. In this way an embodiment is created in which the codes are accommodated in the table in such a way that the units of the corresponding hexadecimally numbered pages constitute, per column, a consecutive series of decimal digits and the tens of the hexadecimally numbered pages constitute, per row, a numerical continuation of the tens of the decimally numbered pages. The rest of the hexadecimally numbered pages is accommodated in further rows.

A further embodiment of the method is characterized in that each code is accommodated at two consecutive character positions of a teletext page. More codes are then available per teletext page.

A teletext receiver provided with decoding means for receiving a table in which a code for consecutive decimally numbered teletext pages is accommodated in successive columns of consecutive rows is characterized in that the decoding means are adapted to decode codes for hexadecimally numbered teletext pages which are accommodated in further rows of the table.

BRIEF DESCRIPTION OF THE DRAWINGS

FIGS. 2A and 2B show examples of data packets which are transmitted by a transmission station shown in FIG. 1.

DESCRIPTION OF THE PREFERRED EMBODIMENTS

Figure 1:
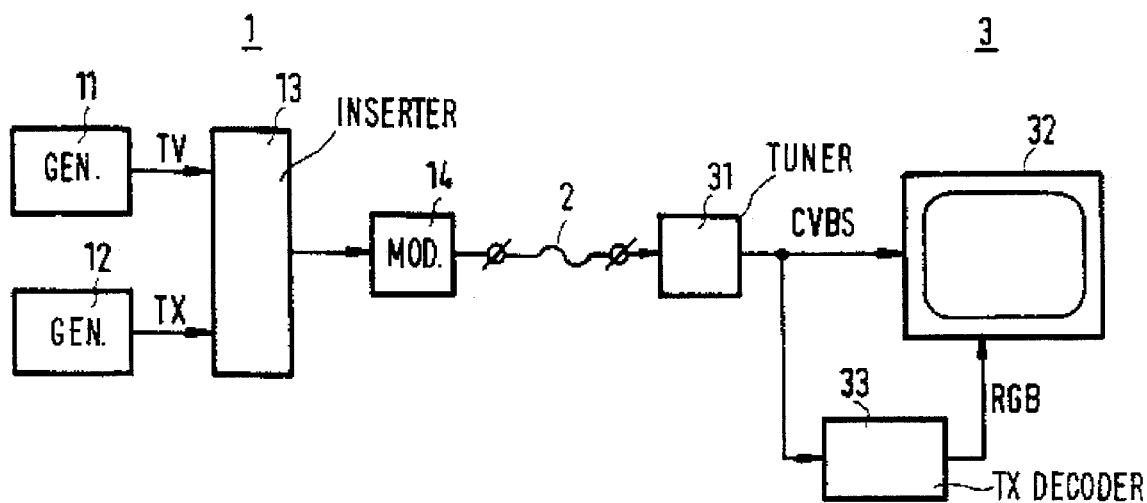
FIG. 1 shows diagrammatically a teletext transmission system to explain the method according to the invention.

FIG. 1 shows diagrammatically a teletext transmission system to explain the method according to the invention. The system comprises a transmission station 1, a transmission medium 2 and a receiver 3. The transmission station comprises a television signal generator 11, a teletext signal generator 12, a teletext inserter 13 and a modulator 14. The television generator 11 generates a picture signal TV, the teletext generator 12 generates a teletext signal TX. Both signals are combined in teletext inserter 13 to a video signal which is applied to the modulator 14 and transmitted via transmission medium 2. The receiver 3 comprises a tuner 31 for demodulating the video signal. The demodulated video signal CVBS is applied for further processing and display to a television monitor 32. The video signal is also applied to a teletext decoder 33. This decoder decodes the teletext signal accommodated therein and applies a teletext picture signal RGB to the television monitor 32.

Figures 2A, 2B:
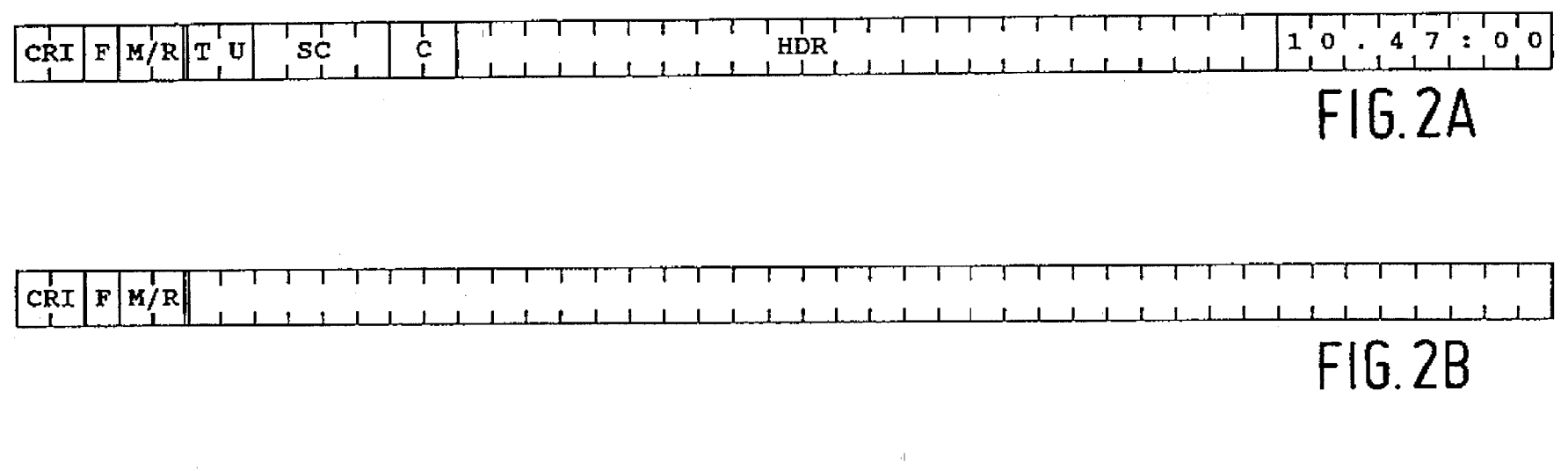

The teletext signal comprises for each transmitted teletext page a plurality of data packets which are accommodated in further known manner in picture lines of the video signal during the field retrace period. FIG. 2 shows some possible forms of these data packets in greater detail. As has been attempted to show in this Figure, each data packet comprises 45 bytes of 8 bits each. The first 2 bytes having a fixed value 1010..10 are referred to as "clock-run-in" and are denoted by CRI in the Figure. The third byte is referred to as the "framing code" F and also has a fixed value. The next 2 bytes comprise a 3-bit magazine number M and a 5-bit row number R. The significance of the other 40 bytes is dependent on the value of the row number R. If the row number R has one of the values 1–25, as assumed in FIG. 2B, then the 40 bytes constitute a text row of 40 characters for display on a display screen in the Level 1 display format.

If the row number R has the value 0, as is assumed in FIG. 2A, the data packet constitutes a header of a teletext page. The series of 40 bytes of such a header starts with two digits T (tens) and U (units) of the page number, a sub-code SC and a plurality of control bits C. The digits T and U each comprise four bits and may thus assume the values 0-F (in the hexadecimal numerical system). The remaining part of the header comprises 24 character positions with a page header HDR and 8 character positions for display of the current time.

The transmission of a teletext page starts with, and implies, the header of this page and subsequently comprises the relevant text rows. Generally, a series of teletext pages is transmitted in a repetitive cycle. The 3-digit page number is constituted by the magazine number M, tens T and units U. The basic pages which can be called by the user have a decimal page number in the range between 100 and 899. For extension pages a hexadecimal page number is often used, of which at least one digit T or U has a value in the range between A and F.

Figure 3:
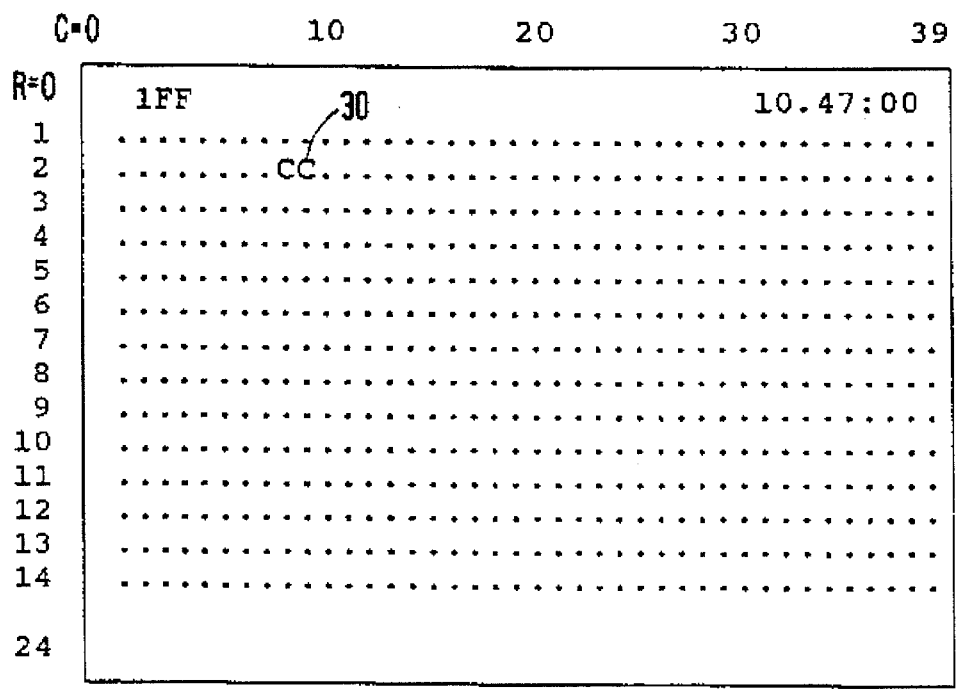
FIG. 3 shows an example of a table which is transmitted by a transmission station shown in FIG. 1.

One of the transmitted teletext pages is a TOP page (Table Of Pages). FIG. 3 shows a possible example. As described hereinbefore, the page comprises 25 rows of 40 characters each. The character positions are numbered horizontally from 0 to 39 and vertically from 0 to 24. Two consecutive characters constitute a code CC, one of which is denoted in the Figure by the reference numeral 30. The code CC indicates, for example for a teletext page whether this page is actually transmitted or whether it is the first of a group of pages about a given subject, or whether it is a rotating page, and the like. The TOP page shown in FIG. 3 comprises only the codes for the teletext pages of one magazine. It will be assumed that this is the magazine in which the TOP page itself is transmitted. In FIG. 3, in which the TOP page has the number 1FF, all codes thus relate to the teletext page numbers 100-1FF.

Figures 4, 5:
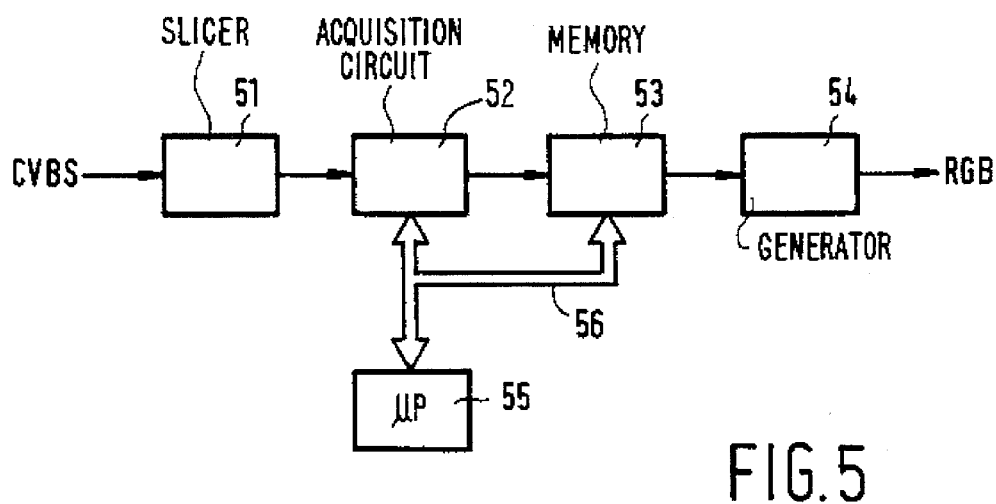
FIG. 4 shows a possible relation between teletext page numbers and the positions of codes in the table shown in FIG. 3.
FIG. 5 shows in greater detail a teletext decoder shown in FIG. 1.

The TOP page shown in FIG. 3 forms a table. There is an unambiguous relation between the coordinates of the elements of the table and a teletext page number. For the purpose of explanation, FIG. 4 shows an example of the table indicating the corresponding teletext page numbers. The table comprises 14 rows (r=0–13) and 20 columns (c=0–19). The corresponding page numbers are indicated by means of two digits in the range between 00 and FF. The first digit (i.e. the magazine number) is identical for all pages, viz. 1. The TOP page of other magazines is divided in a corresponding manner.

As is shown in FIG. 4, the table comprises a field 41 of 5 rows (r=0..4) in which the codes are accommodated for the decimal pages 100–199. A further field 42 of 3 rows (r=6–8) comprises the codes of a portion of the hexadecimal pages. More particularly, the first row of this field corresponds to the pages 1A0–1A9 and 1B0–1B9, the second row corresponds to the pages 1C0–1C9 and 1D0–1D9, and the third row corresponds to 1E0–1E9 and 1F0–1F9. This division is, as it were, a continuation of the division of the first field. In the horizontal direction, the numerical sequence of 0–9 of the units of the page numbers is maintained and in the vertical direction the series of tens in the hexadecimal range A–F is continued. The codes for the remaining pages are accommodated in a third field 43.

As is known, empty text rows of teletext pages (i.e. rows having 40 spaces) need not be transmitted. In fact, non-transmitted text rows are automatically provided with spaces by a teletext decoder (hexadecimal code 20) when the page is erased. The division of the table shown in FIG. 4 benefits therefrom. In practice, only a limited number of hexadecimal teletext pages is transmitted. By arranging that a space code in the table has the significance of absence of the corresponding page in the transmission, the transmission of text rows for the fields 42 and 43 in FIG. 4 may be dispensed with in many cases. This yields an efficient transmission of the TOP page(s).

FIG. 5 shows in greater detail the teletext decoder denoted by 33 in FIG. 1. The decoder comprises a data slicer 51 for regaining the data packets from the video signal CVBS, an acquisition circuit 52 for selecting the data packets of a desired page, a memory 53 for storing the selected data packets and a character generator 54 for displaying a page. The decoder further comprises a microprocessor 55. Said microprocessor may read and write the memory 53 via a communication bus 56. Particularly, the microprocessor may read the received TOP pages and use the codes accommodated therein for reserving memory space for extension pages.

Figure 6:
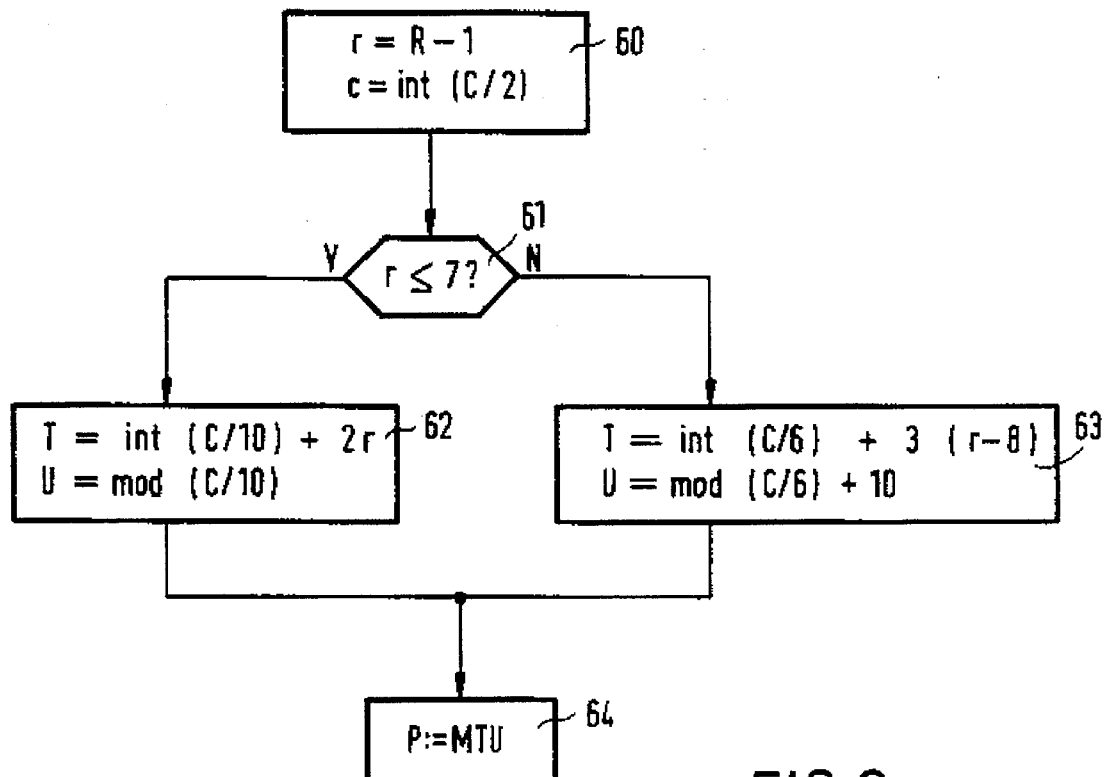
FIGS. 6 and 7 show flow charts of control programmes executed by a microprocessor shown in FIG. 6.

The operation of the teletext decoder shown in FIG. 5 is determined by a control programme which is stored in the microprocessor. FIG. 6 shows the flow chart of a control program for computing the teletext page number corresponding to a code CC at position (R,C) in the TOP page (see FIG. 3). In a step 60 of the control program the row number $R(1 \leq R \leq 14)$ and the character position $C(0 \leq C \leq 39)$ are converted into a row number $r(0 \leq r \leq 13)$ and column number $c(0 \leq c \leq 19)$, respectively, of the table (see FIG. 4). For computing the page number, a distinction is made in a step 61 between $r \leq 7$ (the fields 41 and 42 shown in FIG. 4) on the one hand and $r>7$ (field 43) on the other hand. For $r \leq 7$ the tens T and the units U of the page number are computed in a step 62 by means of the following operations.

$$T=\mathrm{int}(c/10)+2r \text{ and } U=\mathrm{mod}(c/10)$$

Here, int(c/10) and mod(c/10) are the quotient and the remainder, respectively, of the division c/10. For r>7, the following operations are performed in a step 63:

$$T=\mathrm{int}(c/6)+3(r-8) \text{ and } U=\mathrm{mod}(c/6)+10$$

In a step 64 the page number P is composed from the magazine number M of the TOP page (in this case 1), the tens T and the units U.

Figure 7:
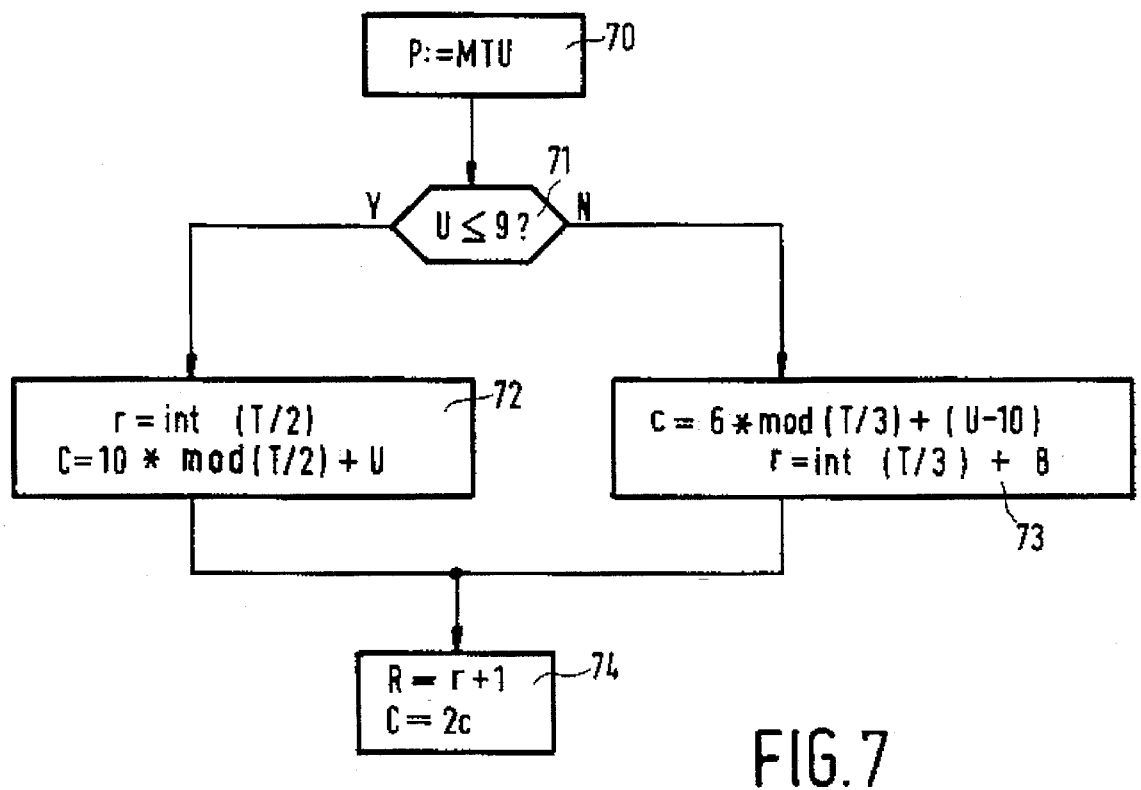

FIG. 7 shows the flow chart of a further control program being a control program for reading, in the TOP page, of the code CC for a given page number. In a step 70 of the control program the magazine number M, the tens T and the units U are determined for the page number P. In a step 71 the control programme checks whether the units U constitute a decimal number (U≦9). In that case the following operations are performed in a step 72:

$$r=int(T/2) \text{ and } c=10*mod(T/2)+U$$

A position (r,c) in one of the fields 41 or 42 of the table (see FIG. 4) is obtained thereby. In the other case the operations $$r=int(T/3)+8 \text{ and } c=6*mod(T/3)+(U-10)$$

are performed in a step 73. A position (r,c) in field 43 of the table is obtained thereby. In a step 74 the table position (r,c) is converted into a character position (R,C) of the TOP page and the code is read at this and the subsequent character position.

I claim:

1. A method of transmitting teletext pages, comprising the steps of:

transmitting a table containing codes for consecutive decimally numbered teletext pages arranged in successive columns and consecutive rows, and transmitting codes for hexadecimally numbered teletext pages, characterized by the additional step of arranging said codes for all of the hexadecimally numbered pages in further rows of the table, aligned with related columns.

2. A method of transmitting teletext pages, comprising the steps of:

transmitting a table containing codes for consecutive decimally numbered teletext pages arranged in successive columns and consecutive rows, each column containing codes for pages having a same units number, and codes for pages having a same tens number being in a same row, and transmitting codes for hexadecimally numbered teletext pages, characterized by the additional step of arranging said codes for the hexadecimally numbered pages in further rows of said table, codes for hexadecimally numbered pages having a decimally numbered units number being in respective columns containing codes for said pages having a same units number, and arranging codes for hexadecimally numbered pages having a hexadecimal units number in still further rows of the table aligned with related columns.

3. A method as claimed in claim 2, characterized in that said further rows are arranged between said rows of codes for decimally number pages and said still further rows, and in said still further rows, codes for pages having a decimal tens number precede rows having hexadecimal tens number.

4. A method as claimed in claim 2, characterized in that each code is accommodated at two consecutive character positions of a teletext page.

5. A method as claimed in claim 4, characterized in that said further rows are arranged between said rows of codes for decimally number pages and said still further rows, and in said still further rows, codes for pages having a decimal tens number precede rows having hexadecimal tens number.

6. A method as claimed in claim 5, characterized in that said table has 20 columns, each column comprising two character positions, each of said further rows and said rows of codes for decimally numbered pages including 10 columns of codes for pages having a first respective tens number followed by 10 columns of codes for pages having the next tens number higher than said respective tens number; and all but the last of said still further rows including 18 columns aligned with the first 18 of said 20 columns.

7. A transmission station for transmitting teletext pages, comprising:

means for transmitting a table containing codes for consecutive decimally numbered teletext pages arranged in successive columns and consecutive rows, each column containing codes for pages having a same units number, and codes for pages having a same tens number being in a same row, and means for transmitting codes for hexadecimally numbered teletext pages, characterized in that said means for transmitting codes arranges said codes for the hexadecimally numbered pages in further rows of said table, codes for hexadecimally numbered pages having a decimally numbered units number being in respective columns containing codes for said pages having a same units number, and said means for transmitting codes arranges codes for hexadecimally numbered pages having a hexadecimal units number in still further rows of the table aligned with related columns.

8. A transmitting station as claimed in claim 7, characterized in that said means for transmitting codes arranges said codes for hexadecimally numbered pages such that the columns of codes for corresponding hexadecimally numbered pages constitute, per column, a consecutive series of decimal digits; and the rows of codes for corresponding hexadecimally numbered pages constitute, per row, a numerical continuation of the tens of the decimally numbered pages.

9. A transmitting station as claimed in claim 8, characterized in that each code is accommodated at two consecutive character positions of a teletext page.

10. A teletext receiver comprising:

decoding means for receiving a table containing codes for consecutive decimally numbered teletext pages arranged in successive columns and consecutive rows, each column containing codes for pages having a same units number, and codes for pages having a same tens number being in a same row, and for receiving codes for hexadecimally numbered teletext pages, characterized in that said decoding means decode codes for all of hexadecimally numbered pages in further rows of said table.

11. A teletext receiver as claimed in claim 10, characterized in that said decoding means decodes codes for hexadecimally numbered pages having a decimally numbered units number being in respective columns containing codes for said pages having a same units number, and decodes codes for hexadecimally numbered pages having a hexadecimal units number in still further rows of the table aligned with related columns.

12. A teletext receiver as claimed in claim 11, characterized in that said decoder decodes codes which are each accommodated at two consecutive character positions of the teletext pages.

* * * * *